D. G. LITTLEFIELD.

Fire Pot for Stoves.

No. 1,516. Reissued Aug. 4, 1863.

Witnesses.
Edward Wilson
Philip Fitzsimon

Inventor.
Dennis G Littlefield

N. PETERS, Photo-Lithographer, Washington, D. C.

UNITED STATES PATENT OFFICE.

DENNIS G. LITTLEFIELD, OF ALBANY, NEW YORK.

IMPROVEMENT IN FIRE-POTS FOR STOVES.

Specification forming part of Letters Patent No. 32,635, dated June 25, 1861; Reissue No. 1,516, dated August 4, 1863.

*To all whom it may concern:*

Be it known that I, DENNIS G. LITTLEFIELD, of the city and county of Albany and State of New York, have invented a new and useful improvement in the fire-pot or burning-chamber adapted to a class of stoves which employ a supply-cylinder for reserve coal, and in which the products of combustion pass out sidewise through apertures in the sides of the fire-pot into an exterior case that includes said fire-pot within it and incloses a space wherein the heated products of combustion operate for transmitting heat through the said case to the surrounding apartment; and I do hereby declare that the following specification, with the drawings hereunto annexed, making a part of the same, is a full and exact description of my invention.

In stoves of this description the fire-pot or burning-chamber heretofore has been constructed wholly of iron. One manifest defect of such a metallic material is the facility with which the parts between the apertures are burned or melted away by being inwrapped in intense flame, and the consequent expense of repairs. Another defect arises from the rapid heat-conducting property of iron, which prevents the coal in immediate contact with the sides of the fire-pot from being heated to a sufficiently high degree to produce perfect combustion.

Figure 1:
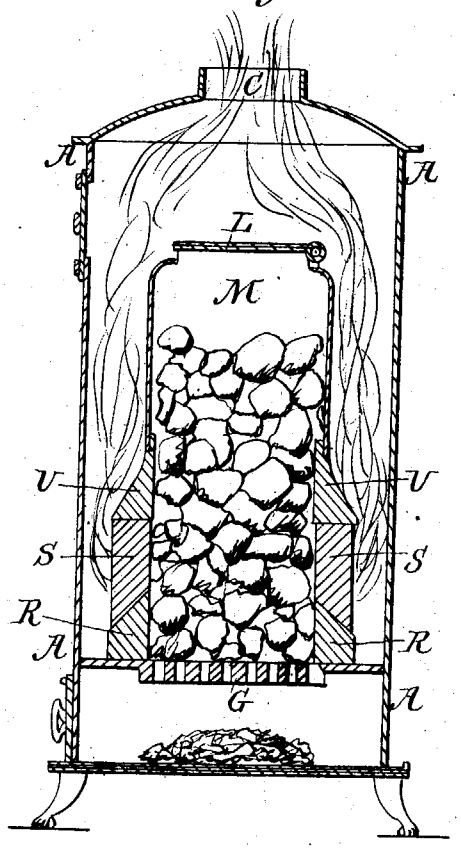
Figure 2:
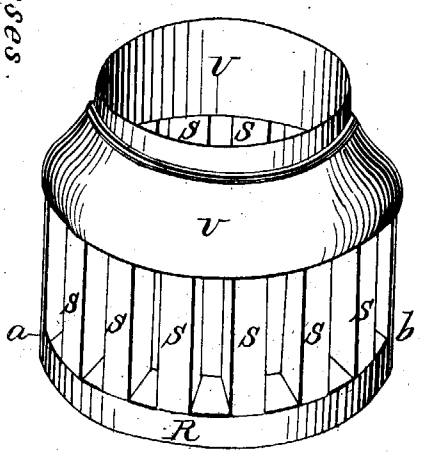
Figure 3:
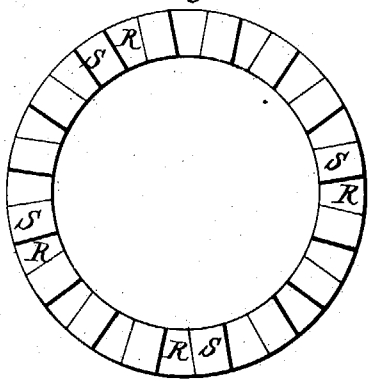

My invention is intended to remedy these defects, and the method of accomplishing it is sufficiently exemplified in the accompanying drawings, in which Figure 1 represents a central vertical section of a stove of the class indicated above, with my improved fire-pot or burning-chamber applied thereto; Fig. 2, a view in perspective of the fire-pot itself; Fig. 3, a horizontal section of the fire-pot near the lower ends of the outlet-apertures, or at the height *a b*, Fig. 2.

Like letters in the several figures indicate corresponding parts.

The supply-cylinder for reserve coal in this stove is represented at M with its cover L. Under this, and supporting it, is the fire-pot, represented in different parts by different letters, U R S, and the external case, into which the products of combustion pass, is indicated at A, having an exit-flue, C, through which the waste products of combustion pass off to the chimney.

A portion of the fire-pot may be made of iron, consisting of two parts—namely, an upper part, U, intended to receive at the top the supply-cylinder M, and a lower part or ring, R. But the main part of the fire-pot is to be made of bars S S, situated at a distance from one another, and inserted into the upper and lower metallic parts, U R, by their ends fitting into recesses or sockets, respectively, in the lower edge of the part U and in the upper edge of the ring R. The entire structure is held together by screw-rods or by any other suitable appliances. These bars are made of soapstone, fire-brick, or any equivalent refractory or indestructible and slowly-conducting material, shaped or molded into prismatic or any other suitable form, as indicated in the drawings. The spaces between these bars compose the apertures in the fire-pot or burning-chamber through which the products of combustion pass out into the space inclosed by the exterior case, A.

The iron portions U and R of the fire-pot, being situated respectively above and below where the principal combustion of the coal takes place, are comparatively little affected thereby, and the bars S S, though exposed to the most intense heat, are not affected to any injurious extent. Thus it will be seen that this improved fire-pot or burning-chamber furnishes a cheaper and more durable article for the intended purpose than has been done before, and also a better fire-pot for use, since the soapstone or fire-brick bars S S, retaining more heat, the fire burns at a higher temperature, and consequently the combustion is more perfect, producing more heat than with a fire-pot or burning-chamber of this description composed wholly of iron.

The compound construction of the fire-pot or burning-chamber with iron top and bottom ring and soapstone or fire-brick bars, all fastened together by screw-rods, enables any one of the bars to be readily taken out and replaced if broken or otherwise injured.

The drawings represent a cylindrical fire-pot with vertical bars, but this form is not essential, and may be changed to an oval, square, oblong, or polygonal form, and the aperture may be as represented in the drawings, or of less extent, so as to adapt it to the form of the stove required. The bars S S may be changed to a horizontal or oblique position, as circumstances may require, but the form and arrangement shown are the most simple, and, in practical use, the most substantial and durable.

Having thus fully described my invention, therefore I wish it to be understood that I do not limit myself to any special form of fire-pot or burning-chamber, nor to any particular arrangement or position of its parts; but

What I claim as my invention, and desire to secure by Letters Patent, is—

1. In the construction of that class of stoves which has a supply-cylinder for reserve coal and an external case which surrounds the fire-pot and incloses a space into which the products of combustion pass sidewise through apertures in said fire-pot, the employment of soapstone, fire-brick, or other equivalent refractory or indestructible and slowly-conducting material to compose that part of the fire-pot or burning-chamber between or immediately around said apertures, substantially as and for the purposes specified.

2. In combination with the supply-cylinder M, the rings or framing-pieces U R, constructed so as to admit the use, removal, and replacement of separate soapstone, fire-brick, or other equivalent refractory or heat-resisting material, substantially as and for the purpose herein specified.

DENNIS G. LITTLEFIELD.

Witnesses:

J. S. BROWN,

EDM. F. BROWN.